United States Patent [19]
Keenan et al.

[11] 3,942,911
[45] Mar. 9, 1976

[54] BLADED ROTORS

[75] Inventors: John Gregory Keenan, Cheltenham; John Alfred Chilman, Stroud; Ivor Harold Brooking, Gloucester, all of England

[73] Assignee: Dowty Rotol Limited, Gloucester, England

[22] Filed: Feb. 15, 1974

[21] Appl. No.: 443,146

[30] Foreign Application Priority Data

Feb. 17, 1973 United Kingdom ................. 7884/73
Feb. 17, 1973 United Kingdom ................. 7885/73

[52] U.S. Cl. .............................. 416/157 A; 416/174
[51] Int. Cl.² .......................................... B64C 11/38
[58] Field of Search ....... 416/48, 49, 151, 153, 157, 416/157 A, 174, 146

[56] References Cited

UNITED STATES PATENTS

| | | | |
|---|---|---|---|
| 2,023,785 | 12/1935 | Hoover | 416/157 A |
| 2,592,124 | 4/1952 | Diefenderfer | 416/48 X |
| 2,830,668 | 4/1958 | Gaubis et al. | 416/157 |
| 2,850,103 | 9/1958 | Pearl | 416/157 |
| 2,891,627 | 6/1959 | Ditmer et al. | 416/157 X |
| 2,910,126 | 10/1959 | Jedrziewski | 416/157 |
| 3,003,566 | 10/1961 | Conn et al. | 416/49 X |
| 3,240,275 | 3/1966 | Bennett | 416/157 X |
| 3,395,763 | 8/1968 | Avena et al. | 416/157 X |
| 3,635,584 | 1/1972 | Chilman et al. | 416/157 A X |
| 3,663,119 | 5/1972 | Brooking et al. | 416/157 A |
| 3,720,060 | 3/1973 | Davies et al. | 416/157 A UX |
| 3,794,440 | 2/1974 | McMurtry | 416/157 X |
| 3,876,333 | 4/1975 | Ronson | 416/157 |

FOREIGN PATENTS OR APPLICATIONS

| | | | |
|---|---|---|---|
| 567,710 | 1945 | United Kingdom | 416/157 A |

*Primary Examiner*—Everette A. Powell, Jr.
*Attorney, Agent, or Firm*—Young & Thompson

[57] ABSTRACT

A bladed rotor including a hub which carries, so as to be rotatable therewith, a liquid reservoir, at least one pump operable upon rotation of the rotor, a single liquid-pressure-operable vane-type actuator for adjusting the blades of the rotor to vary flow of fluid over the blades, and control valve means for controlling operation of the actuator. The said pump, when operating, draws liquid from the reservoir and delivers it under pressure, by way of said control valve means, to said actuator.

12 Claims, 5 Drawing Figures

BLADED ROTORS

This invention relates to bladed rotors.

According to the invention a bladed rotor includes a hub which carries, so as to be rotatable therewith, a liquid reservoir, one or more pumps operable upon rotation of the rotor, a single liquid-pressure-operable vane-type actuator for adjusting the blades of the rotor to vary flow of fluid over the blades, and control valve means for controlling operation of the actuator, said one or more pumps, when operating, drawing liquid from said reservoir and delivering it under pressure, by way of said control valve means, to said actuator.

Mechanical means may connect said one or more pumps with non-rotative structure external of the rotor to afford their operation upon rotation of the rotor. The said mechanical means may include gearing, also carried by the hub, and shafting coaxial with the hub and extending from the gearing to said non-rotative structure.

The reservoir may be of annular form, being defined at least in part by an outer wall of the hub, liquid being retained in the reservoir by centrifugal force during rotation of the rotor.

The actuator may be of the balanced kind and have its axis of rotation coincident with the axis of rotation of the rotor.

The hub may carry a further pump which, when said one or more pumps are inoperative or substantially so, is operable, by motor means carried by non-rotative structure external of the rotor, to supply pressure liquid to the actuator for feathering of the blades.

The reservoir may comprise two parts, one associated with said one or more pumps and the other associated with said further pump.

The said further pump may be operable upon rotation of the rotor by means of further shafting, an end portion of which has means associated therewith for holding it fast with respect to non-rotative structure external of the rotor, and said associated means being released when the motor means is required to operate said further pump.

By so providing a bladed rotor including, in self-contained manner, the reservoir, the pump or pumps, the control valve means and the actuator, all rotatable therewith, the rotor is independent of any external source of liquid supply for its operation, it only being necessary for control signals to be introduced from non-rotative structure external of the rotor into the rotative hub.

Figure 2B:
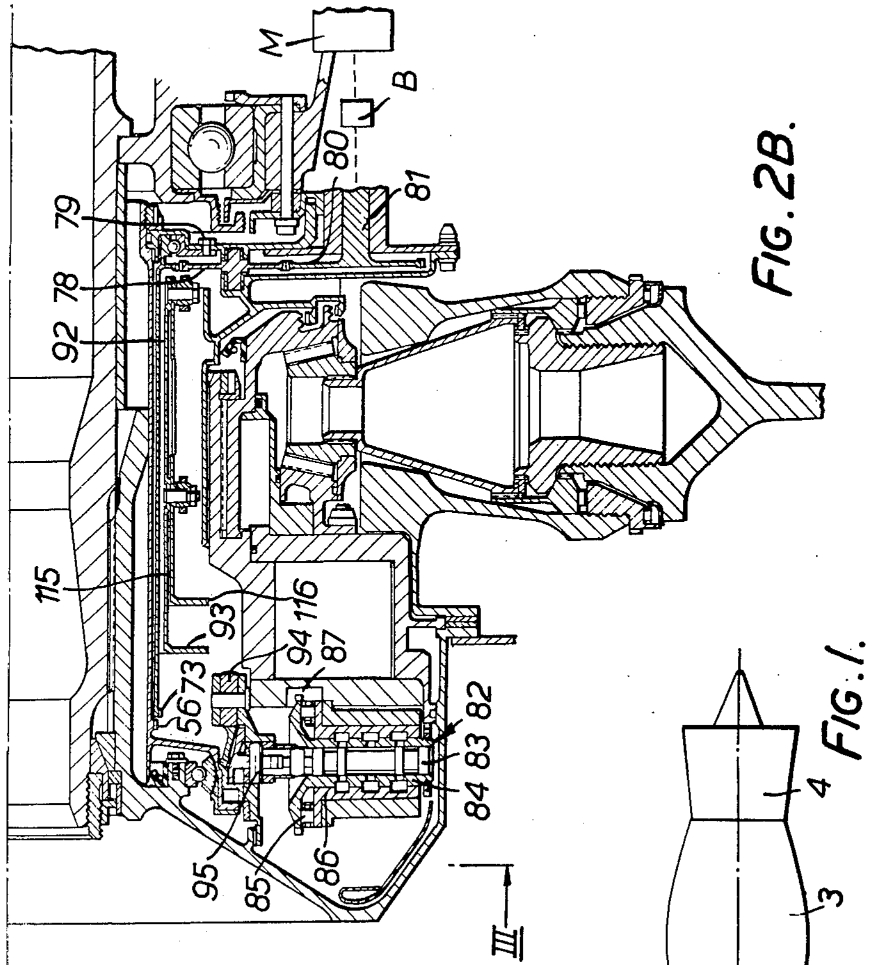
Figure 1:
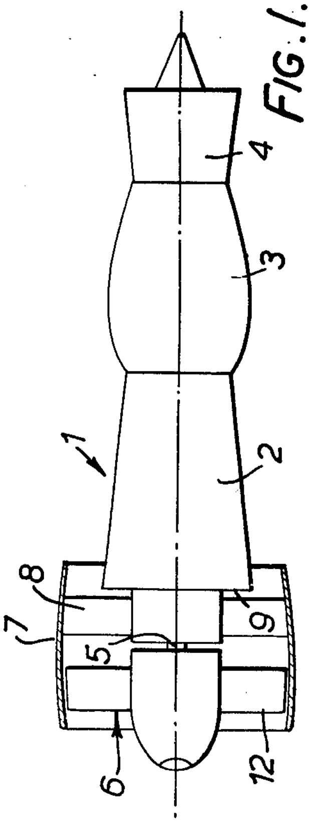
Figure 2A:
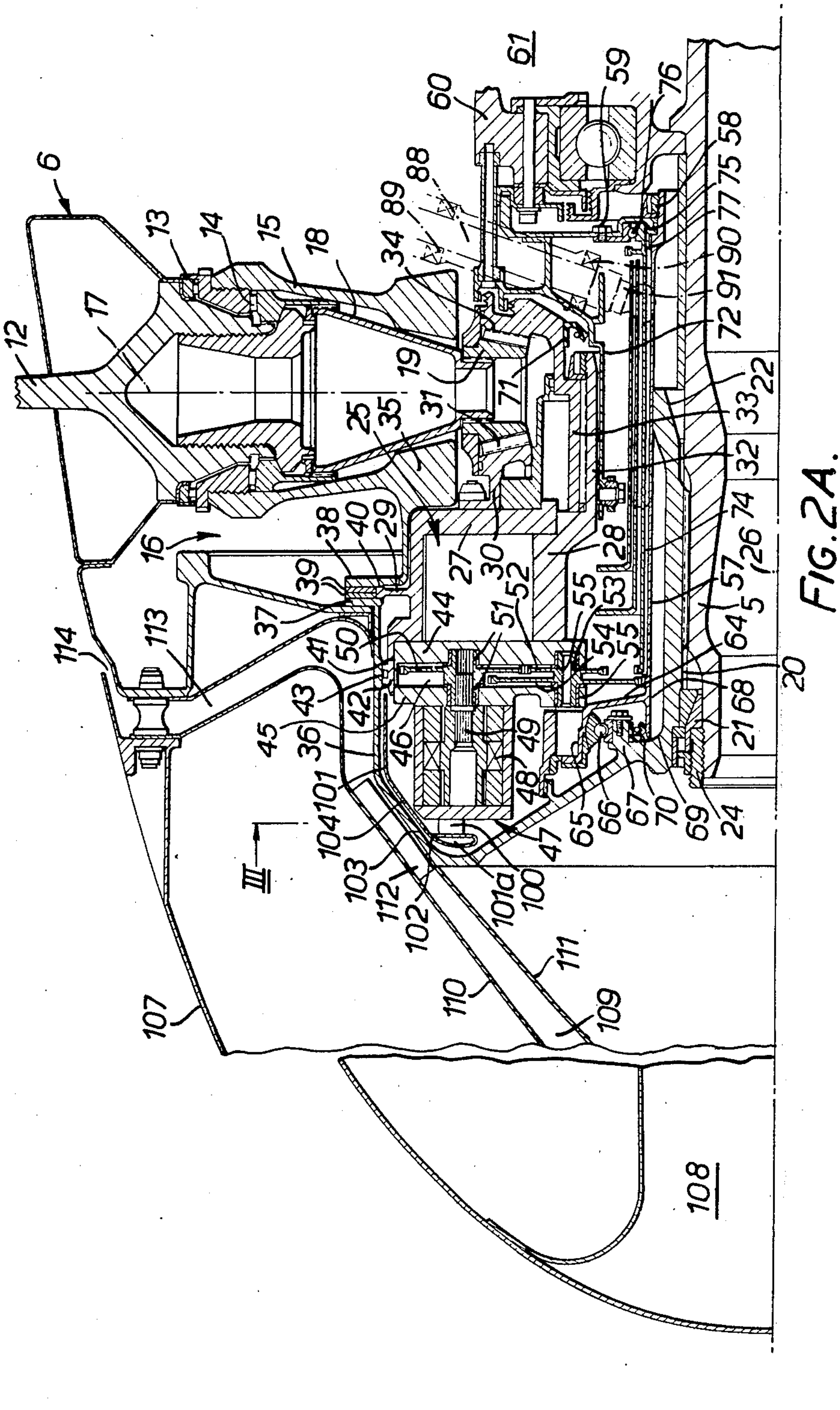
Figure 3:
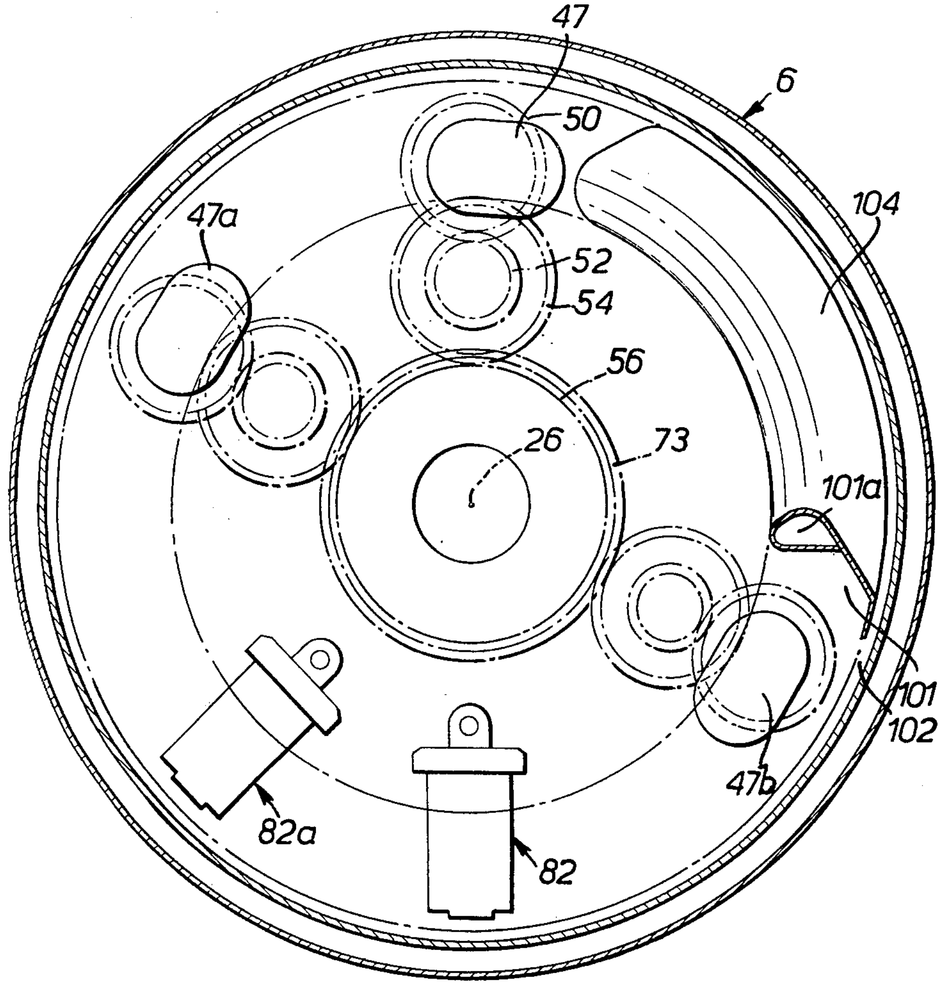
Figure 4:
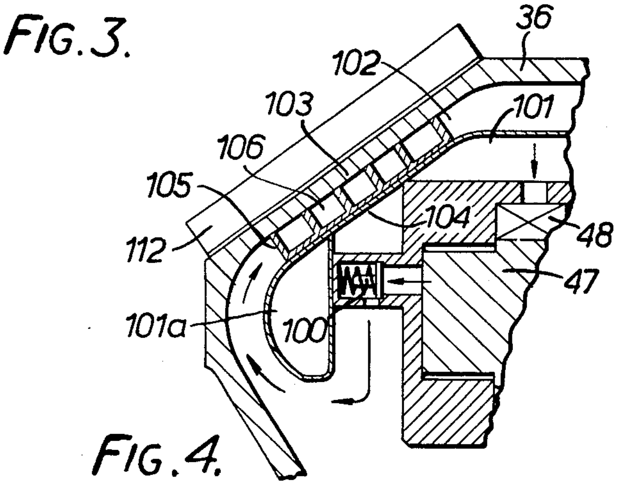

One embodiment of the invention will now be particularly described by way of example with reference to the accompanying drawings, of which, FIG. 1 is a partial cross-sectional diagrammatic side elevation of a gas turbine engine of the by-pass type having a ducted-fan, FIG. 2, comprising upper part A and lower part B, is an enlarged cross-section of the hub of the fan shown in FIG. 1, FIG. 3 is a diagrammatic cross-section taken along the line III — III on FIG. 2, and, FIG. 4 is an enlarged view of a portion of FIG. 2A.

Referring to the drawings, an aircraft gas turbine engine 1 comprises a compressor 2, a combustion section 3 and a turbine section 4. A splined output shaft 5 of the engine carries a fan 6, the subject of this invention, which is rotatable within a by-pass duct 7, itself mounted upon the casing of the compressor 2 by means of stator blades 8. The fan thus charges both the by-pass duct 7 and the inlet 9 of the compressor 2.

The fan 6 comprises a bladed rotor having fourteen blades 12, each mounted as shown in FIG. 2 in bearings 13 and 14 in respective sockets 15 carried by a hub 16. The blades are variable in pitch about their longitudinal pitch-change axes 17 and each is connected by means of a splined member 18 to a respective bevel gear 19 within the hub 16.

The hub 16 is generally of annular form having a splined central opening 20 which incorporates a pair of cone mountings 21, 22 by which the rotor is adapted for ready fitment to the output shaft 5. A screw-threaded ring member 24 retains the rotor in the axial sense on the shaft 5.

Pitch-variation of the blades is effected by the operation of a servo mechanism which includes a pitch-change actuator 25, for example of the hydraulically-operable balanced-vane-type, which is rotatable with the rotor 6 and which has its axis of rotation coincident with the axis 26 of rotation of the rotor.

The actuator 25 which is of annular form and enclosed within the hub 16 has a multiplicity of chambers, in this embodiment twelve, formed by a first multi-vaned assembly or actuator part 27 and a second multi-vaned assembly or actuator part 28.

The parts 27 and 28 are both capable of angular movement with respect to the hub 16 about the axis 26, and are movable in opposite directions, the one with respect to the other. The outer wall of the actuator is formed with a radially-outwardly-directed flange 29. The part 27 has a rearwardly-extending member 30 bolted thereto which is formed with a ring of bevel gear teeth 31 which is in engagement with all of the blade bevel gears 19.

The part 28 has a rearwardly-extending portion 32 of externally-splined tubular form upon which is mounted an internally-splined stepped tubular member 33 which, at its rearward end portion, is provided with a ring 34 of bevel gear teeth. The ring 34 engages all of the blade bevel gears 19, the points of meshing of the bevel gear rings 31 and 34 with each bevel gear 19 being substantially diametrically-opposed upon the latter. A bladed rotor having such an actuator is disclosed in U.S. Pat. No. 3,664,763.

The annular hub basically comprises a rearward portion 35 from which the blade sockets 15 project and a forward portion 36 which provides the hub with its annular configuration. The forward portion and the rearward portion are both provided with radially-outwardly-directed flanges 37 and 38 which are suitably bolted together with a pair of distance pieces 39 located between them. In this way an annular recess 40 is provided on the inside of the outer wall of the hub 16. This recess receives the flange 29 of the part 27 of the actator 25. The flange 29 therefore provides a means of mounting the actuator in the hub with the ability for the part 27 to move angularly with respect to the wall of the hub about the axis 26.

The part 27 is provided with a forwardly-extending tubular portion 41 which is itself formed with a land 42 which incorporates a sealing ring 43. The land 42 forms a forward bearing for the part 27, and the portion 41 surrounds an annular plate 44 which forms the forward end wall of the actuator part 27.

A further annular plate 45 is disposed in front of and is fixed to the annular plate 44, and cavities as at 46 are defined between the two annular plates which house gear trains as hereinafter described.

Mounted in convenient manner upon the forward face of the annular plate 45 and thus carried by the actuator part 27 are three gear pumps, 47, 47*a* and 47*b*.

Each of the gear pumps comprises a pair of externally-meshing gears, one gear being shown at 48. Such pumps are similar to that disclosed in U.S. Pat. No. 3,490,382. Each pump is driven by means of a splined quill 49 whose axis is parallel with the axis 26. Each quill 49 is connected to a spur gear 50 housed in a cavity 46 and supported for rotation in bearings 51 provided in bores in the annular plates 44 and 45.

The spur gear 50 associated with the pump 47 is in mesh with a sppur gear 52 of smaller diameter than the spur gear 50 and mounted fast upon a shaft 53 which carries a larger spur gear 54. The shaft is mounted in bearings 55 provided in bores in the annular plates 44 and 45. The spur gear 54 is in mesh with a ring of gear teeth 56 formed integrally with a hollow shaft 57 coaxial with the shaft 5. The shaft 57 extends rearwardly through and beyond the hub and at its end portion remote from the part having the ring 56 is anchored as at 58 to non-rotative structure 59 which is carried by the forward end portion 60 of a reduction gear casing 61 of the engine.

The second pump 47*c* is similar to the pump 47 and is suitably mounted upon the plate 45 in a position spaced circumferentially from the pump 47. This second pump is likewise driven through a gear train similar to that associated with the pump 47 and associated with the ring of teeth 56.

Thus with rotation of the bladed rotor 6 since the shaft 57 is held fast at 58 at its rearward end, the respective gears 54 rotate around the ring of teeth 56 and in consequence drive the first and second gear pumps 47, 47*a* through the respective gears 52 and 50.

The first pump 47 has a lower flow capacity than the second pump 47*a* so that it is concerned with pitch-change operation of the actuator at relatively slow rates, while the second pump is concerned with providing additional pressure liquid for operation of the pitch-change actuator at fast rates.

The forward end portion of the shaft 57 has a radially-outwardly-directed flange 64 from which extends an axially-directed portion 65. A ball bearing 66 is provided between the portion 65 and an axially-directed flange 67 formed on the inner wall of the forward portion 36 of the hub 16. Between the flange 67 and the forward extremity 68 of the shaft 57 there is provided a sealing ring 69 of V-shaped cross-section having a metallic spring ring 70. This combination forms a lifting seal arrangement whereby when the rotor is rotating at slow speeds or is stationary, the ring 69 is in fluid-sealing engagement with the extremity 68 of the shaft, but when the speed of the rotor exceeds a predetermined value, the centrifugal force on the sealing ring 69 is sufficient to overcome the effort of the spring ring 70 so that the sealing ring breaks contact with the extremity 68 to avoid the generation of undue friction therebetween.

A similar lifting seal arrangement is provided at 71 between the rearward end portion of the member 33 and a stepped tubular member 72 which is held fast in suitable manner with respect to the member 59 and thus the forward end portion 60 of the casing 61.

The third gear pump 47*b* forms a feathering pump, and is mounted parallel with the other two gear pumps, being driven by a similar gear train. However, this gear train is not in mesh with the ring of teeth 56 but is instead in mesh with a ring of teeth 73 formed at the forward end portion of a tubular shaft 74 which surrounds the major portion of the length of the shaft 57 and which extends rearwardly towards the structure 59. At its rearward end portion 75 the shaft 74 is mounted in a ball bearing 76, and just forward of this bearing the shaft is provided with a ring of teeth 77. These teeth mesh with an idler spur gear 78 mounted for rotation in non-rotative structure at 79. The idler gear is, in turn, in mesh with a spur gear 80 also mounted for rotation in non-rotative structure and arranged to be driven through shafting 81 by a feathering motor M mounted upon the non-rotative structure. This motor is of electrical type and brake means B are provided for locking the shafting 81 fast with respect to non-rotative structure during normal pitch-changing operation of the bladed rotor 6.

The annular plate 45 supports a positional control valve assembly 82 which is radially disposed and which comprises a landed spool 83 which is linearly movable within a flanged ported sleeve 84. The sleeve is mounted in roller bearings 85 in an outer sleeve 86 and a ring of gear teeth 87 is provided upon the flanged portion of the sleeve 84 by which the sleeve is in operation continuously rotatable with the two pitch-change pumps by means of gearing in mesh with the gearing associated with those pumps.

An input member 88 mounted in bearings 89 and 90 in non-rotative structure is suitably connected by links as at 91 to a control tube 92 which connects through a translation bearing 93 with a pivoted lever 94 mounted upon the actuator 25. A cam slot and roller arrangement 95 is associated with the lever 94 and with the spool 83. Rotary movement of the input shaft 88 effects linear movement of the tube 92 which in turn through the translation bearing 93 effects rotary movement of the lever 94. The cam slot and roller arrangement 95 translates the rotary movement of the lever 94 into linear movement of the spool 83.

Each of the gear pumps housed within the forward portion 36 of the hub 16 has a respective relief valve, the one associated with the pump 47 being generally indicated at 100. These relief valves all discharge into the hub space forward of the pumps. The discharging liquid is guided under centrifugal force into an annular reservoir 101 by way of an annular space or passage 102 which is defined by the outer wall 103 of the forward part of the portion 36 and a substantially frusto-conical annular baffle or deflector 104 which is positioned inwardly of the wall 103. The baffle 104 has, upon its exterior forwardly-facing surface, an upstanding spiral formation 105 whereby a spiral channel 106 is formed in the annular space or passage 102. An annular feathering reservoir 101*a* is formed by the baffle 104 and the feathering pump 47*b* draws its liquid therefrom. The pumps 47, 47*a* draw their liquid directly from the reservoir 101.

A spinner 107 for the bladed rotor 11, and rotatable therewith has a central opening 108 at the nose portion thereof which merges into an annular divergent duct 109 formed by an inner wall 110 of the spinner and an inner cone member 111 which fairs into the forward portion 36 of the hub 16 as shown. The wall 110 is provided with a ring of impeller blades 112 disposed substantially in alignment with the sprial formation 105. During flight of the aircraft in which the engine is installed ram air passes through the opening 108 and into the duct 109, thereafter passing to atmosphere towards the rear of the spinner by way of an outwardly-directed duct 113, into which the duct 109 opens, and an annular opening 114.

Enclosed within the forward portion 36 of the hub 16, is a condition control valve assembly, shown diagrammatically at 82*a* in FIG. 3, the setting of which determines the particular mode of operation of the bladed rotor. This assembly also comprises a spool and a continuously-rotatable sleeve. The modes of operation in this embodiment are normal running, feathering operation, unfeathering operation and pitch-change beyond the positive range into the negative range. Operation of the spool of this condition control valve assembly is effected in a manner similar to the operation of the spool 83 by an input member (not shown) which is circumferentially spaced from the member 88 and also mounted in bearings in non-rotative structure, and which is co-operable with a tube 115 which connects with the spool of the condition control valve assembly by way of a translation bearing 116 and suitable cam mechanism (not shown).

The above construction thus provides a self-contained bladed rotor, forming the fan of a gas turbine engine of the ducted-fan by-pass type, which includes a reservoir, three gear pumps, two for normal pitch-changing operations and the third for feathering and unfeathering operation, positional and condition control valve means, a balanced vane-type actuator, upon one part of which the control valve means are mounted, and gearing whereby the actuator is connected to the blades for effecting pitch-change thereof.

In operation the gas turbine engine drives the bladed rotor 6, the brake means B associated with the feathering motor drive shafting 81 being applied so that the ring of gear teeth 73 is stationary. Also the ring of gear teeth 56 is stationary by virtue of its anchorage 58 to non-rotative structure.

Hence, with rotation of the rotor all three gear pumps within the forward portion 36 of the hub 16 are driven through their respective gear trains, and provided the spool 83 is in its neutral position, as shown in the drawing, the discharge from the low flow pump 47 passes through its relief valve to reservoir by way of the spiral channel 106 provided in the annular space or passage 102, while the discharge from the high flow pump 47*a* is caused to pass directly to reservoir through suitable means. The spool of the condition control valve assembly 82*a* is, while the feathering motor brake means is applied, positioned so that the feathering pump 47*b* discharges its delivery through suitable by-pass means (not shown) to the reservoir. Ram air which, during flight of the aircraft, passes through the central opening of the spinner 107 is impelled by the blades 112 along the duct 109 and the duct 113 and out to atmosphere through the annular opening 114. Thus cooling air is brought into heat-exchange relation by way of the wall 103 of the forward portion 36 of the hub 16 with the liquid discharging from the relief valve means through the spiral channel 106 to the reservoir 101.

During normal running operation of the rotor the condition control valve assembly is maintained in its "normal running" condition.

When during such normal running it is required normally to adjust the pitch of the blades 12, for example in the pitch-coarsening direction, the input shaft 88 is rotated in the appropriate direction under the control of a pilot's control lever, with the result that the tube 92 is displaced axially and through the translation bearing 93 adjusts the lever 94 which, in turn, through the cam slot and roller arrangement 95 adjusts the setting of the spool 83. The delivery from the low flow pump 47 which is available at the spool is now thereby directed to the coarse pitch chambers of the balanced vane-type actuator 25, while the fine pitch chambers thereof are placed in communication through suitable ducting with reservoir. Consequently the parts 27 and 28 of the actuator are angularly adjusted about the axis 26 in opposite directions. Since the angular movements of these parts are equal in magnitude, but opposite in sense, the turning moments applied to the blades 12 through the gear rings 31 and 34 and the bevel gears 19 are equal and additive about the blade pitch-change axis 17. However, since these moments are applied at positions diametrically-opposite to each other upon each gear 19, a balance is achieved in the journal loading of the blade root bearings 13 and 14.

By such displacement of the parts of the actuator 25 the blades 12 are adjusted in the coarse pitch direction to an extent dependent upon the setting of the spool 83. As the required blade pitch angle is reached the spool 83 is automatically returned to its neutral position. Such return movement is effected by virture of the fact that the positional control valve assembly is carried by one of the movable parts of the actuator and a differential effect between that part of the cam slot and roller arrangement 95 effects the necessary displacement of the spool with respect to its sleeve.

If, during normal running operation, the pilot moves the member 88 rapidly, consequent over-travel of the spool 83 automatically operates means (not shown) which blocks the flow to reservoir from the high flow pump 47*a* and causes delivery flow therefrom instead to combine with that of the low flow pump 47 whereby the liquid under pressure from both pumps now passes by way of the control valve means to the actuator thereby achieving a faster rate of pitch change of the blades.

For normal pitch-fining of the blades, during normal running operation, at either slow or fast rates the member 88 is moved in the opposite direction to displace the spool 83 in the direction necessary for such pitch-finding.

When, due to an emergency in flight, or for any other reason it is required to feather the blades 12 of the bladed rotor, the fuel supply to the engine is cut off and the brake means B associated with the feathering pump motor shafting 81 is released. Simultaneously the spool of the condition control valve assembly 82*a* is moved by its input member (not shown) and tube 115 away from its "normal running" position to its "feather-selecting" position whereupon the direct flow to reservoir from the feathering pump 47*b* is blocked and delivery flow therefrom instead passes through the condition control valve assembly. As the bladed rotor loses speed, the feathering pump motor M is energised whereupon the gears 80 and 78 drive the shaft 74. Hence the ring of teeth 73 in engagement with the gear train associated with the feathering pump 74*b* rotates, thereby effecting operation of the feathering pump. This pump draws liquid from the feathering reservoir 101*a* and this liquid, which by-passes the positional control valve assembly, is directed by the condition control valve assembly to the coarse pitch chambers of the vane-type actuator 25. At the same time the fine pitch chambers of the actuator are placed in communication with the reservoir. Hence the blades are rapidly feathered and upon completion of the feathering operation the feathering motor is automatically de-energised.

For subsequent unfeathering of the blades the feathering motor is again energised, the spool of the condition control valve assembly being suitably set for this operation. The feathering pump delivery flow thus passes through the condition control valve assembly and is thereafter directed through the positional control valve assembly to the fine pitch chambers of the actuator while the coarse pitch chambers are placed in communication with drain. Consequent movement of the actuator components in opposite directions effects unfeathering of the blades.

Suitable pitch stop means (not shown) is included within the hub 16 which must be rendered inoperative when it is required to move the blading beyond the positive pitch range into the negative pitch range for braking of a vehicle, for example an aircraft, in which the engine is fitted. The spool of the condition control valve assembly is movable to a further setting whereby this stop means is so rendered inoperative.

Although not shown in the drawings, suitable baffle means may be provided between the rings of gear teeth 56 and 73 so that if, for example due to some malfunctioning, the teeth 56 are damaged, particles thereof are less likely to reach the teeth 73 to cause futher damage.

By so providing a single liquid-pressure-operable blade-adjusting actuator disposed with its rotational axis coincident with the rotational axis of the rotor, and by so mounting the normal pitch-change pumps and the feathering pump, as well as the control valve means, on the forward side of one of the actuator parts with the annular reservoir disposed around them with each of the pump inlet ports disposed immediately adjacent to the reservoir as shown in FIG. 4 for good pump priming, a very compact form of self-contained bladed rotor is provided. The close proximity of the pitch-change components affords very immediate response characteristics during the pitch-changing operation. Further, the annular form of the hub 16 facilitates very ready attachment of the rotor upon the output shaft of the associated engine.

Also by providing two pumps for normal pitch-change and a further pump for feathering and unfeathering of the blades, the further pump being drivable by the feathering motor, two independent pumping systems are present. Thus if a failure in the operation of said two pumps for normal pitch-change occurs, due for example to some mechanical defect in the drive thereto, the feathering pump drive, being mechanically independent from that of those two pumps, can operate in an unimpeded manner for the feathering operation.

Again by providing the spiral formation which forms a spiral channel in the space formed between the relief valve means and the reservoir and by causing the liquid discharged by the relief valve means to flow through the spiral channel in heat-exchange relation with the air conducted by the ring of impeller blades 112 across the exterior surface of the forward portion of the hub, heat generated in the liquid upon pressure relief is dissipated into the air so conducted along the duct 109 and through the opening 114 that overheating of the liquid passing to the reservoir is avoided.

The invention is not limited to the provision of a baffle or deflector having a spiral formation, as in other embodiments deflectors of other form may be used, or alternatively in some bladed rotors it may only be necessary to provide the said space with cross-sectional dimensions of a particular order to achieve the desired cooling effect in the liquid discharging from the relief valve means to the reservoir.

In some alternative embodiments of the invention it may not be necessary to include impeller blades within the spinner structure to produce a flow of cooling air upon the exterior surface of the hub, as a simple cooling duct may instead be provided in the spinner structure. Further, in less-sophisticated installations the hub itself may project forwardly with no spinner structure surrounding it.

Although in the embodiment described with reference to the drawings, the two pumps for normal blade adjustment draw their liquid from the annular reservoir 101 while the pump for feathering and unfeathering draws its liquid from the feathering reservoir 101*a*, in other embodiments all the pumps may draw their liquid from a single reservoir.

The invention is not limited to the provision of pumps of gear type within the hub, as in other embodiments other suitable forms of pump may with advantage be used.

Further, the invention is not limited in its application to fans of gas turbine engines of the ducted-fan by-pass type, as in other embodiments of the invention such bladed rotors may be intended for installation in other machines where it is also desirable for those rotors to each be of self-contained form carrying, so as to be rotatable therewith, a liquid reservoir, one or more pumps and an actuator. We claim:

1. A bladed rotor including a hub and adjustable blades carried by the hub, said hub including, housed wholly therein in close proximity to each other and rotatable all as one therewith, (a) structure defining a liquid reservoir of annular form which, during rotation of the rotor, is independent of any liquid supply source external of said rotor, (b) a single liquid-pressure-operable vane-type actuator which is disposed with its axis of rotation coincident with the axis of rotation of the rotor, which is connected to said blades for effecting adjustment thereof to vary flow of fluid over the blades and which comprises two cooperable multi-vaned actuator components, (c) at least one pump which is so mounted upon one of said two components that its inlet port is disposed immediately adjacent to said reservoir and its axis of rotation is substantially offset from and parallel to the axis of rotation of the rotor, said pump being operable consequent upon rotation of the rotor to draw liquid directly and only from said reservoir, and, (d) control valve means by way of which liquid discharged under pressure by said pump is directed to operate said actuator.

2. A bladed rotor as claimed in claim 1, and a central drive shaft on which said rotor is mounted, said actuator being annular and surrounding said drive shaft.

3. A bladed rotor as claimed in claim 1, said pump being disposed at least in part in said annular reservoir.

4. A bladed rotor as claimed in claim 1, and input means adapted to extend from non-rotative structure external of the rotor to the interior of said hub for transmitting input signals to said control valve means for initiating adjustment of the actuator and thus of the blades.

5. A bladed rotor as claimed in claim 1, said components being movable in opposite directions the one with respect to the other about said axis, both said components being connected to said blades for effecting adjustment thereof to vary flow of fluid over the blades.

6. A bladed rotor as claimed in claim, said pump being mounted upon an external end face of one of said components.

7. A bladed rotor as claimed in claim 6, said control valve means being also mounted upon said external end face.

8. A bladed rotor as claimed in claim 6, and shafting which is connected fast at one end with non-rotative structure external of the rotor and which passes coaxially into the hub and through the actuator, gearing associated with the other end of said shafting for affording continuous drive from said shafting outwardly thereof to said pump for operation thereof consequent upon rotation of the rotor, said pump being mounted upon said external end face through the intermediary of an annular plate which is so spaced from said end face that a cavity is formed between said plate and said end face, said gearing affording drive from said shafting to said pump being disposed at least in part in said cavity.

9. A rotor as claimed in claim 1, wherein said hub carries a further pump which, when said one pump is inoperative or substantially so, is operable, by motor means carried by non-rotative structure external of the rotor, to supply pressure liquid to the actuator for feathering of the blades.

10. A rotor as claimed in claim 9, wherein said reservoir comprises two parts, one associated with said one pump and the other associated with said further pump.

11. A rotor as claimed in claim 9, wherein shafting is provided whereby said further pump is operable upon rotation of the rotor, an end portion of said shafting having means associated therewith for holding it fast with respect to non-rotative structure external of the rotor, and said associated means being released when the motor means is required to operate said further pump.

12. A rotor as claimed in claim 9, wherein said further pump is mounted upon said component of the actuator and has its axis of rotation parallel to said axis of rotation of the rotor.

* * * * *